United States Patent [19]

Reiters

[11] 4,050,976
[45] Sept. 27, 1977

[54] STRAIN GAGE APPLICATION

[75] Inventor: Ludvigs O. Reiters, Natick, Mass.

[73] Assignee: Bofors America, Inc., Edison, N.J.

[21] Appl. No.: 652,894

[22] Filed: Jan. 27, 1976

[51] Int. Cl.² .................. B32B 31/00; B32B 15/08
[52] U.S. Cl. .......................... 156/233; 156/235;
  156/247; 156/249; 156/298; 428/209; 428/901;
  338/2
[58] Field of Search ............ 156/235, 233, 247, 249,
  156/298, 335; 338/2; 29/592, 593; 428/901,
  209, 914

[56] References Cited

U.S. PATENT DOCUMENTS

| | | | |
|---|---|---|---|
| 2,963,773 | 12/1960 | Starr | 428/428 |
| 3,279,969 | 10/1966 | Borchardt | 156/235 |
| 3,609,624 | 9/1971 | Nagy | 338/2 |
| 3,611,241 | 10/1971 | Herceg | 338/2 |
| 3,950,200 | 4/1976 | Muramoto | 428/901 |
| 3,984,598 | 10/1976 | Sarazin | 156/233 |

Primary Examiner—Ellis Robinson
Attorney, Agent, or Firm—James E. Mrose

[57] ABSTRACT

Electrical-resistance strain gages, particularly those of foil construction, are advantageously pre-packaged as conveniently-manipulatable and protected sub-assemblies in which the metal gage grid and its tabs are sandwiched between a flexible tape coated with a tacky adhesive and a partly-cured thin layer of fiber-reinforced resin, the resin layer and exposed portions of the adhesive-coated tape in turn being protected by a removable polytetrafluorethylene cover sheet; bonding of the gage to a measurement specimen is achieved without conventional cementing by removing the cover sheet, abutting the resin layer with a selected surface of the specimen, heating the layer while pressing against the tape to force the gage partly into the layer and to force the layer against the specimen surface, and stripping the tape after the resin has cured, thereby leaving the gage in a firmly-bonded close proximity with the specimen surface, separated therefrom only by a thinned layer of fiber-reinforced resin which also locks with the gage filaments partly embedded within that layer.

7 Claims, 6 Drawing Figures

STRAIN GAGE APPLICATION

BACKGROUND OF THE INVENTION

Wire and foil elements disposed in substantially sinuous planar grid patterns have been widely used for sensing surface conditions such as strain, and have conventionally been applied to the surfaces under investigation by bonding cements and the like. In the case of highly miniaturized and exceedingly thin grids of foil, particularly, manufacturing and handling considerations have dictated that the metal foil grid be supported upon an insulating backing sheet, the latter in turn being adhered to the measurement-specimen surface by way of bonding cement. Such cements are known in a variety of compositions, and their use for the aforesaid bonding entails much care if the gage installation is to be reliable. Even at best, however, the gage responses to strain or to other influences, necessarily reflect unavoidable disturbing characteristics of both the backing and the cement, each of which is of material different from that of the other. An especially troublesome consequence is that of so-called gage "creep," a term which applies to slip of the gage relative to the surface to which it is cemented, and which involves apparent relaxation of the gage due to such factors as slip, softening or yielding of the cement, and/or like disturbances of the backing sheet, and/or similar disturbances at interfacing between the backing sheet and cement or between the cement and specimen surface or between the backing sheet and material of the gage grid. Creep is of course not conducive to accuracy, and represents a significant drawback inasmuch as the gages are intended to respond very precisely for the well-known purpose of enabling accurate measurements of elastic strain resulting from loading stresses of elements such as beams, columns, rings, diaphragms and other load or force sensing members. In addition, the usual cementing can involve difficulties in control of cement thickness, and problems with punching of the gage grid by particles found in thick paste cements, and unwanted overall of the installation, and resulting deficiencies in hysteresis, strain sensitivity, and linearity characteristics.

Related problems are advantageously minimized according to the present invention by eliminating the usual cementing altogether, and by instead bonding the gage to a specimen surface via a single thin layer of resin cured in situ in bonded relationship both to the surface and to the foil elements. In the latter connection, an improved installation and locking of the gage elements occurs because of partial embedments of the elements into the resin. Prior to installation, the gage is pre-packaged in a form convenient for handling and installation, as the result of unique processing.

SUMMARY OF THE INVENTION

By way of summary account of underlying recognitions and of preferred practices and embodiments of this invention, a generally-conventional form of strain-gage grid is initially supported upon a suitable transfer-backing sheet and is then transferred to a flexible tape coated with pressure-sensitive adhesive, after which the transfer sheet is peeled away and replaced by a thin uniform-thickness sheet of a B-stage thermosetting resin material (i.e., partly cured, and readily dealt with on that account). In turn, a protective cover layer of polytetrafluorethylene is applied over the exposed resin material, creating a pre-packaged sub-assembly suitable for shipping and manipulation into an installation position. Once the locus of a desired installation is determined, the cover layer is removed and the resin sheet and that exposed side of the sheet is engaged with the specimen surface to which it is to be bonded, the gage elements and adhering tape being on the other side (i.e., outside) of the resin sheet. While applying external pressure to the tape, the partly-readied installation is exposed to heat sufficient to effect final curing of the resin, whereupon the tape may be peeled from the resin-bonded gage to leave the gage properly exposed for electrical connection to associated circuitry while securely and uniformly bonded to the specimen surface through the resin layer alone.

Accordingly, one of the objects of the present invention is to provide novel and improved cementless and creep-resistant electrical strain gage installations in which but a thin layer of thermosetting resin finally cured in situ secures gage elements to a measurement surface and promotes better operating characteristics for the gage.

Another object of the invention is to provide unique laminated strain-gage sub-assemblies which may be conveniently applied to specimens for controlled-thickness direct-resin bonding without intervening cement.

Still further, it is an object to provide unique and advantageous methods for fabricating pre-packaged strain gage subassemblies and for bonding the gages in such assemblies directly to specimens by way of a controlled-thickness resin finally cured at the installation sites without intervening cement.

BRIEF DESCRIPTION OF THE DRAWINGS

Although the aspects and features of this invention which are considered to be novel are set forth in the appended claims, further details as to preferred practices and as to the further objects and features thereof may be most readily comprehended through reference to the following description taken in connection with the accompanying drawings, wherein:

DESCRIPTION OF THE PREFERRED EMBODIMENT

Figure 1:
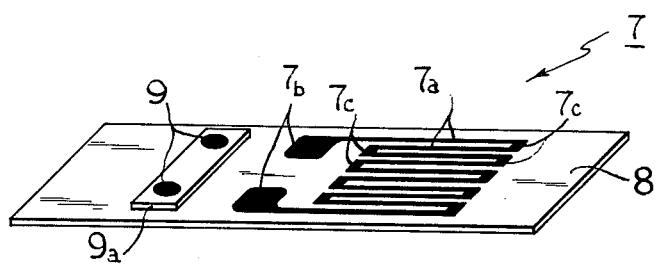
FIG. 1 illustrates the general form of a foil-type strain gage, with associated enlarged end connections, as developed atop a transfer backing.
Figure 2:
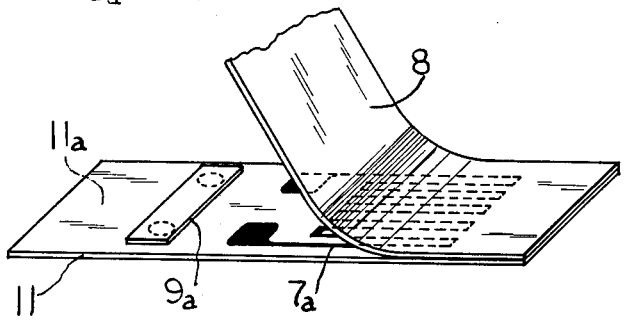
FIG. 2 depicts the same gage applied to an adhesivelycoated tape and the transfer backing being removed.

Referring next to the drawing, wherein like reference characters designate identical or corresponding parts throughout the several views, and more particularly to FIG. 1 thereof, there is shown an electrical-resistance strain gage arrangements, 7, wherein thin conductive metal foil grid elements 7 a in a parallel array are series-connected with enlarged terminal areas 7b by way of end connections 7 c. That known arrangement appears exposed atop a somewhat flexible "transfer" sheet 8, having been developed in the illustrated sinuous and precise configuration as the result of photographic and related etching techniques well known in the trade. In addition conductive metal tabs, 9, to which external leads may be secured, and to which the enlarged terminal areas 7b of the gage may be connected, are exposed upon a thin and small insulating member 9a to which they are fixed in spaced relation to the gage.

In implementing the objectives and promoting the advantages already referred to hereinabove, the arrangement of FIG. 1 is turned over and placed, with its exposed conductive surfaces disposed downwardly, upon the upper coated surface 11a of a somewhat flexible sheet or tape 11 coated with tacky adhesive on that surface. Item 11 is preferably a "Kapton" tape, which withstands high temperatures and has its surface 11a coated with silicone pressure-sensitive adhesive, that being a commerically-available item. After pressure has been applied to this sandwiched combination, the transfer backing 8 is peeled away, its pertinent adhesions to the portions of gage 7 and member 9 a being less than those exhibited by the coated tape 11 following pressing, to enable that removal (illustrated in process).

Figure 3:
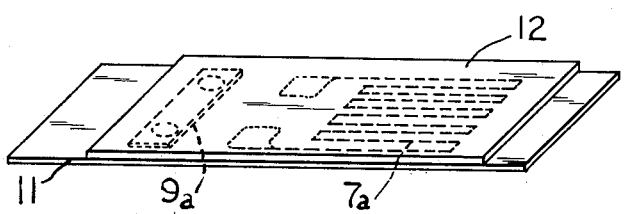
FIG. 3 illustrates the tape-adhered gage together with an overlying uniform-thickness sheet of partly-cured thermosetting resin material substituted for the transfer backing.

Thereafter, the transfer backing 8 is replaced by a substantially uniform-thickness layer of partly-cured thermosetting insulating resin 12 (FIG. 3). Such partly-solidified resin is termed as B stage, and may be finally cured to a hard state by later elevation to an appropriately-high temperature. Preferably, resin layer 12 further involves so-called "glass paper" reinforcement fibers of glass, quartz or other appropriate fine filaments, that paper having been impregnated with the resin. One suitable practice involves impregnating a thin sheet of porous glass paper with single-component monomer resin, originally in liquid form, and then semi-curing the resin by drying in air or in an oven at a relatively low temperature. The porous-paper fibers of glass or the like serve to reinforce the resin layer, reduce its shrinkage, and resist curling, and are of such fineness and resilience, that later final-curing pressures will not cause punching or significant distortion of the critical parts of the thin gage. One example of such a resin is the so-called "Phenoweld 7" resin, a one component modified phenolic heat-cured adhesive, sold by Hardman, Inc., Belleville, N.J., via its Data Sheet 7204/2.

Figure 4:
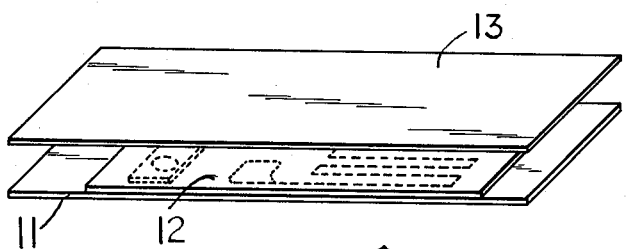
FIG. 4 shows a protective cover of Teflon poised above the arrangement of FIG. 3 to complete subassembly of the gage unit.
Figure 5:
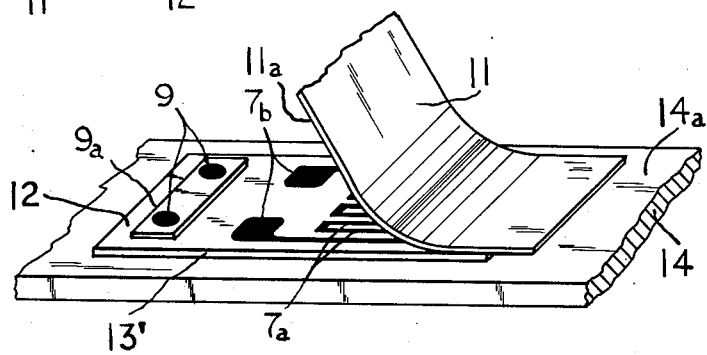
FIG. 5 is a pictorial view of the gage installation atop a measurement specimen as the adhesively-coated tape is being peeled away.

A somewhat flexible sheet or layer of material 13 is next preferably placed atop the reinforced-resin layer 12, as shown in process in FIG. 4, to complete a pre-packaging or sub-assembly having some needed degree of flexibility. Material 13 may be a polytetrafluorethylene such as Teflon, for example, and it serves a desirable protective function for the resin layer 12 while having "parting" characteristics which will enable it to be removed easily after the gage sub-assembly has been handled to the point where the gage to be installed permanently at a selected surface site. At the latter time, with protective cover 13 removed, the thus-exposed surface of partly cured resin layer 12 is placed against the selected measurement surface 14a of a transducer or other force-or-load-withstanding element 14 (FIG. 5), leaving conductive surfaces of the gage and tabs outwardly disposed, under cover of the Kapton tape 11. Pressure is then preferably applied uniformly through tape 14 (example: 50–75 psi, by clamping, not shown), and the entire installation is then exposed to final heat-curing temperatures which will cause resin layer 13 to soften and then to harden. The final heat-curing may be performed in an oven, for example; one suitable practice includes treating in an oven for one-half hour at 275° F and then for one hour at 375° F. After that initial heat-treating, Kapton tape 11 may be peeled away to expose conductive surfaces of the gage and any associated tabs, as is shown to be occurring in FIG. 5. Subsequently, the curing is preferably continued for another hour, at 450° F., followed by cooling to ambient temperture. In FIG. 5, the reinforced-resin layer, suitably cured, is designated by the reference character 13'.

Figure 6:
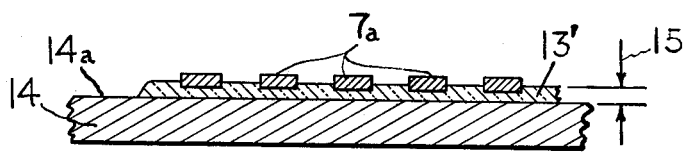
FIG. 6 comprises an enlarged cross-section of a specimen and resin-bonded foil gage, depicting the partial embedments of gage grid elements.

During the final curing operations, the pressures applied by clamping or otherwise through tape 11 press the foil-gage filaments 7a, as well as gage elements 7c and 7b, into shallow partial embodiment in the soft resin layer. When the gage installation has been completed, such filaments and elements are thus securely locked with the hardened resin layer, as illustrated in FIG. 6. That partial embedment also assists in reducing creep effects. The resulting thickness 15 of insulating bonding material 13', involving no cement, can readily be developed at a substantially uniform thickness of about 0.001 inch, whereas conventional cemented foil gages may typically involve a cement layer of about 0.005 inch and a backing material of about 0.0012–0.0013 inch, for a total thickness of nearly 2 mils. The consistently thinner spacing of gage filaments from the specimen surface results in lessened errors in bending measurements, and improved heat transfer is also effected thereby. The resin-impregnated glass paper may typically be only 0.0007 inch thick.

It should be understood that the specific practices and preferred embodiments herein referred to have been offered by way of disclosure, rather than limitation, and that various modifications, additions and substitutions may be effected by those skilled in the art without departure from these teachings; it is therefore aimed in the appended claims to embrace all such variations as fall within the true spirit and scope of this invention.

What I claim as new and desire to secure by Letters Patent of the United States is:

1. In the preparation of a strain-gage, a method for application of fine electrically-conductive metallic foil grids in uncemented attachment to a specimen surface, comprising the steps of supporting a metallic foil grid upon a flexible backing, adhering the thus-supported grid to a tacky surface of a pressure-sensitive flexible tape, removing the backing, replacing the backing with a flexible layer less than about 0.001 inch thick and consisting essentially of a partly-cured fiber-reinforced thermosetting resin, placing and pressing the outer surfaces of the resin layer against a desired surface to which the grid is to be bonded while the tape and grid adhere, effecting a final curing of the resin layer which hardens the same while bonding it both to the desired surface on one side and to the grid on the other, and stripping the tape to expose the grid after the resin layer is sufficiently hardened by curing to bond securely with the grid.

2. A method as set forth in claim 1 wherein said adhering step involves pressing the exposed surfaces of the thus-supported grid securely against the tacky surface of the tape, and wherein the backing is removed by peeling same away from the tape and grid, and wherein the placing and pressing of the resin layer against the desired surface involves applying pressure to the exposed exterior of the tape, and the final curing thereof involves heating same to temperatures for times which effect the final curing.

3. A method as set forth in claim 2 including the further steps of placing a layer of polytetrafluoroethylene material atop the resin layer after replacing the backing with the resin layer, and then stripping the layer of polytetrafluoroethylene material from the resin layer before placing and pressing same against the desired surface.

4. A method as set forth in claim 3 wherein said resin layer consists of a single component modified phenolic formed by impregnating a fine-filament porous paper with the resin in liquid form and then semi-curing same until a uniform-thickness somewhat-flexible layer is realized.

5. A method as set forth in claim 4 wherein said porous paper is one of glass fibers.

6. A method as set forth in claim 2 wherein said grid comprises a metallic foil electrical-resistance strain gage, and wherein the holding placing and pressing of the resin layer against the desired surface includes applying sufficient pressure to the exterior of the tape while the resin layer is softened by the heating to cause filaments and end connections of the foil strain gage to become partially embedded in the resin layer, and thereafter finally curing the resin layer to lock the embedded gage portions with the hardened resin layer.

7. A method as set forth in claim 6 wherein said resin layer is formed by impregnating a fine-filament porous glass paper with thermosetting resin in liquid form and then curing the same until a uniform-thickness somewhat-flexible layer is realized, and wherein the adhesive of said tape is a silicone adhesive.

* * * * *